US008670000B2

(12) United States Patent
Braun et al.

(10) Patent No.: US 8,670,000 B2
(45) Date of Patent: Mar. 11, 2014

(54) OPTICAL DISPLAY SYSTEM AND METHOD WITH VIRTUAL IMAGE CONTRAST CONTROL

(75) Inventors: Max Braun, San Francisco, CA (US); Xiaoyu Miao, Sunnyvale, CA (US); Adrian Wong, Mountain View, CA (US); Babak Amirparviz, Mountain View, CA (US)

(73) Assignee: Google Inc., Mountain View, CA (US)

(*) Notice: Subject to any disclaimer, the term of this patent is extended or adjusted under 35 U.S.C. 154(b) by 136 days.

(21) Appl. No.: 13/230,276

(22) Filed: Sep. 12, 2011

(65) Prior Publication Data
US 2013/0063486 A1  Mar. 14, 2013

(51) Int. Cl.
G09G 5/00 (2006.01)

(52) U.S. Cl.
USPC .......................................................... 345/617

(58) Field of Classification Search
USPC .......................................................... 345/617
See application file for complete search history.

(56) References Cited

U.S. PATENT DOCUMENTS

| 5,526,184 | A | 6/1996 | Tokuhashi et al. |
| 5,715,337 | A | 2/1998 | Spitzer et al. |
| 5,886,822 | A * | 3/1999 | Spitzer .......................... 359/630 |
| 5,943,171 | A | 8/1999 | Budd et al. |
| 5,949,583 | A | 9/1999 | Rallison et al. |
| 6,023,372 | A | 2/2000 | Spitzer et al. |
| 6,091,546 | A | 7/2000 | Spitzer |
| 6,201,629 | B1 | 3/2001 | McClelland et al. |
| 6,204,974 | B1 | 3/2001 | Spitzer |
| 6,317,128 | B1 | 11/2001 | Harrison et al. |
| 6,349,001 | B1 | 2/2002 | Spitzer |
| 6,353,492 | B2 | 3/2002 | McClelland et al. |
| 6,353,503 | B1 | 3/2002 | Spitzer et al. |
| 6,356,392 | B1 | 3/2002 | Spitzer |
| 6,384,982 | B1 | 5/2002 | Spitzer |

(Continued)

FOREIGN PATENT DOCUMENTS

| EP | 2 221 654 A1 | 8/2010 |
| WO | WO 02/33688 A2 | 4/2002 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Aaron M Richer
*Assistant Examiner* — Vu Nguyen
(74) *Attorney, Agent, or Firm* — McDonnell Boehnen Hulbert & Berghoff LLP

(57) ABSTRACT

A method includes generating a light pattern using a display panel and forming a virtual image from the light pattern utilizing one or more optical components. The virtual image is viewable from a viewing location. The method also includes receiving external light from a real-world environment incident on an optical sensor. The real-world environment is viewable from the viewing location. Further, the method includes obtaining an image of the real-world environment from the received external light, identifying a background feature in the image of the real-world environment over which the virtual image is overlaid, and extracting one or more visual characteristics of the background feature. Additionally, the method includes comparing the one or more visual characteristics to an upper threshold value and a lower threshold value and controlling the generation of the light pattern based on the comparison.

19 Claims, 4 Drawing Sheets

(56) References Cited

U.S. PATENT DOCUMENTS

| | | |
|---|---|---|
| 6,538,799 B2 | 3/2003 | McClelland et al. |
| 6,618,099 B1 | 9/2003 | Spitzer |
| 6,693,749 B2 | 2/2004 | King et al. |
| 6,701,038 B2 | 3/2004 | Rensing et al. |
| 6,723,354 B1 | 4/2004 | Spitzer |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,663,805 B2 | 2/2010 | Zaloum et al. |
| 7,724,443 B2 | 5/2010 | Amitari |
| 7,843,403 B2 | 11/2010 | Spitzer |
| 7,900,068 B2 | 3/2011 | Weststrate et al. |
| 2003/0090439 A1 | 5/2003 | Spitzer et al. |
| 2005/0174651 A1 | 8/2005 | Spitzer et al. |
| 2006/0017654 A1 | 1/2006 | Romo |
| 2006/0192306 A1 | 8/2006 | Giller et al. |
| 2006/0192307 A1 | 8/2006 | Giller et al. |
| 2008/0077953 A1* | 3/2008 | Fernandez et al. ............ 725/32 |
| 2008/0219025 A1 | 9/2008 | Spitzer et al. |
| 2009/0122414 A1 | 5/2009 | Amitari |
| 2009/0278766 A1 | 11/2009 | Sako et al. |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0018903 A1 | 1/2011 | Lapstun et al. |
| 2011/0043644 A1* | 2/2011 | Munger et al. ............ 348/207.1 |
| 2011/0213664 A1* | 9/2011 | Osterhout et al. ......... 705/14.58 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Gabbard, Joseph L., et al., "An Empirical User-based Study of Text Drawing Styles and Outdoor Background Textures for Augmented Reality", Virginia Tech (http://people.cs.vt.edu/jgabbard/publications/vr05.pdf), Jan. 3, 2005, 8 pages.

PCT International Search Report and Written Opinion, PCT International Application No. PCT/US2012/054748, dated Jul. 25, 2013.

* cited by examiner

OPTICAL DISPLAY SYSTEM AND METHOD WITH VIRTUAL IMAGE CONTRAST CONTROL

BACKGROUND

Wearable systems can integrate various elements, such as miniaturized computers, input devices, sensors, image displays, wireless communication devices, and image and audio processors, into a device that can be worn by a user. Such systems can provide a mobile and lightweight solution to communicating, computing, and interacting with a user's environment. With the advance of technologies associated with wearable systems and miniaturized optical elements, it has become possible to consider wearable compact optical display systems that augment the user's experience of a real-world environment.

In one example, by placing an image display element or component close to the user's eye(s), an artificial or virtual computer-generated image can be displayed over the user's view of the real-world environment. One or more such image display elements can be incorporated into optical display systems and referred to generally as near-eye displays, head-mounted displays ("HMDs"), or heads-up displays ("HUDs"). Depending upon the size of the display element and the distance to the user's eye, the artificial image may fill or nearly fill the user's field of view.

SUMMARY

In a first aspect, a method includes generating a light pattern using a display panel and forming a virtual image from the light pattern utilizing one or more optical components. The virtual image is viewable from a viewing location. The method also includes receiving external light from a real-world environment incident on an optical sensor. The real-world environment is viewable from the viewing location. Further, the method includes obtaining an image of the real-world environment from the received external light, identifying a background feature in the image of the real-world environment over which the virtual image is overlaid, and extracting one or more visual characteristics of the background feature. Additionally, the method includes comparing the one or more visual characteristics to an upper threshold value and a lower threshold value and controlling the generation of the light pattern based on the comparison.

In a second aspect, a display system includes an image generator configured to generate a virtual image and a first beam splitter optically coupled to the image generator. The virtual image and a real-world view are viewable through the first beam splitter from a viewing location. The display system also includes a second beam splitter optically coupled to the first beam splitter and a camera optically coupled to the second beam splitter. The camera is configured to image the real-world view. Further, the display system includes a controller operatively coupled to the camera and the image generator. The controller is configured to enhance the contrast of the virtual image with respect to the real-world view based on the image of the real-world view.

In a third aspect, a display system includes a display panel configured to generate a light pattern and one or more optical components coupled to the display panel and configured to transmit the light pattern and external light from a real-world environment. The light pattern is viewable from a viewing location through the one or more optical components as a virtual image superimposed over the real-world environment. The display system also includes an optical sensor coupled to the one or more optical components and configured to receive the external light to obtain an image of the real-world environment. Further, the display system includes a processor coupled to the display panel and the optical sensor and configured to identify a background portion of the real-world environment over which the virtual image is superimposed, to extract pixel data corresponding to the background portion, to compare the pixel data to an upper threshold value and a lower threshold value, and to control the generation of the light pattern based the comparison.

DETAILED DESCRIPTION

The present disclosure generally relates to an optical display system that enables a user to observe the user's real-world surroundings or environment and to view a computer-generated virtual image. In some cases, the virtual image overlays a portion of the user's field of view of the real world.

In accordance with one example, the display system of the present disclosure includes a see-through wearable computer system, such as an HMD that displays a computer-generated virtual image that may be overlaid over a portion of the user's field of view of the real-world environment or surroundings. Thus, while the user of the HMD is going about his or her daily activities, such as walking, driving, exercising, etc., the user may be able to see a displayed image generated by the HMD at the same time that the user is looking out at his or her real-world surroundings.

The virtual image may include, for example, graphics, text, and/or video that provide content, such as data, alerts, or indications relating to the user's real-world environment. The content of the virtual image can relate to any number of contexts, including, but not limited to, the user's current environment, an activity in which the user is currently engaged, a biometric status of the user, and any audio, video, or textual communications that have been directed to the user. The virtual image may also be part of an interactive user interface and include menus, selection boxes, navigation icons, or other user interface features that enable the user to interact with the display system and other devices.

The content of the virtual image can be updated or modified dynamically in response to a change in the context, such as a change in the user's real-world field of view, a change in the user's current activity, a received communication, a preset alarm or reminder, an interaction with a user interface or menu, etc. Further, the appearance of the virtual image can be altered or modified in response to background features of the real-world field of view over which the virtual image is overlaid. More particularly, visual characteristics of the virtual image can be altered or modified to increase or decrease the contrast between the virtual image the background features.

Figure 1:
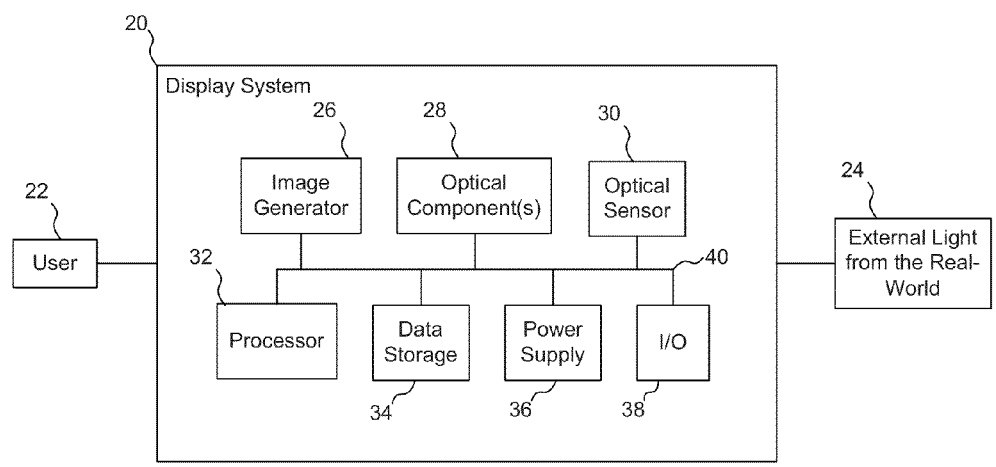
FIG. 1 is a block diagram of a display system in accordance with an example embodiment.

Referring now to FIG. 1, a display system 20 in accordance with an example embodiment enables a user 22 to observe a real-world environment and to view a computer-generated virtual image. In FIG. 1, the user's view of the real-world environment is observed by receiving external light 24 from the real world. The illustrated display system 20 includes an image generator 26, one or more optical components 28, an optical sensor 30, a processor 32, data storage 34, a power supply 36, and other input/output ("I/O") components 38. The various components 26-38 of the display system 20 of FIG. 1 are operatively coupled together by a connection 40, which can represent any number of wired or wireless electrical connections and/or direct or indirect physical or optical couplings, for example.

Generally, the processor 32 controls the image generator 26 to generate a light pattern that is directed through the optical component(s) 28 to form the virtual image that is viewable by the user 22. In addition, the processor 32 and the optical sensor 30 are configured to obtain an image or representation of the real-world environment and to identify a background feature in the real-world environment over which the virtual image is overlaid. The processor 32 is further configured to determine a visual characteristic of the background feature and to control the light pattern generated by the image generator 26 adjust the contrast between the virtual image and the background feature.

In one example, the light pattern is modified to increase the contrast between the virtual image and the background so that the virtual image is more distinguishable from the background. In this example, the contrast may be increased so that information displayed by the virtual image is more easily identified by a user.

In another example, the light pattern is modified to decrease the contrast between the virtual image and the background so that the background may be more visible through the virtual image. In this example, the contrast may be decreased to provide so that the user can more clearly see the real-world environment.

The contrast between the virtual image and the background feature can be adjusted by modifying one or more visual characteristics of the virtual image, for example, hue, saturation, brightness or intensity of the virtual image and/or a background brightness of the image generator 26, size, location, font, etc.

For example, in response to the processor 32 determining that the virtual image is overlaid on a background feature that is relatively dark, the virtual image can be adjusted to include brighter colors to increase the contrast or to include darker colors to decrease the contrast. In another example, in response to the processor 32 determining that the virtual image is overlaid on a background feature that is relatively bright, the virtual image can be adjusted to include darker colors to increase the contrast or to include brighter colors to decrease the contrast.

In the present example, the data storage 34 can be any suitable device or computer readable medium that is capable of storing data and instructions that can be executed by the processor 32 to control the image generator 26, to obtain the representation of the real-world environment, to identify a background feature in the real-world environment over which the virtual image is overlaid, to determine visual characteristics of the background feature, and to control other components of the display system 20, for example. The power supply 36 provides electrical power to the various components of the display system 20 and can be any suitable rechargeable or non-rechargeable power supply. Further the I/O components 38 may include switches, dials, buttons, touch screens, etc. that allow the user 22 to interact with the display system 20. The I/O components 38 may also include, for example, speakers, microphones, biometric sensors, environmental sensors, and transmitters and/or receivers for communicating with other devices, servers, networks, and the like.

Figure 2:
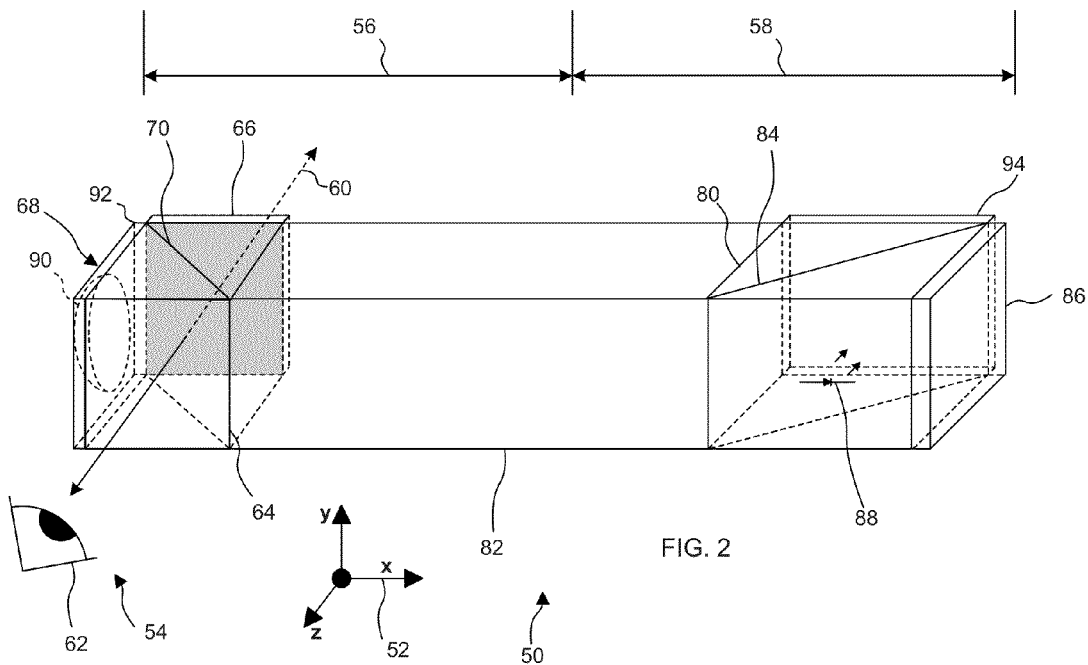
FIG. 2 is an isometric schematic view of an optical system in accordance with an example embodiment.

FIG. 2 shows an isometric schematic view of an optical system 50 in accordance with an example embodiment. For purposes of illustration, the optical system 50 is described with reference to an XYZ coordinate system 52 and in relation to a viewing location 54. The optical system 50 generally includes a first proximal portion 56 and a second distal portion 58. In typical operation, the proximal portion 56 is disposed adjacent the viewing location 54 and defines a viewing axis 60 therethrough. An object 62, such as an eye of a user or a camera or other optical sensor, can be positioned generally at the viewing location 54 to view a real-world environment and a computer-generated virtual image. The real-world environment and the virtual image can be viewable simultaneously. For example, the virtual image may overlay a portion of the user's view of the real-world environment.

In FIG. 2, the distal portion 58 extends generally horizontally along the x-axis from the proximal portion 56 such that the distal portion is to the right of the proximal portion from the perspective of the viewing location 54. However, other configurations are possible, for example, the distal portion 58 can be to the left of the proximal portion 56, the optical system 50 can extend vertically with the distal portion located above or below the proximal portion, or the distal portion can extend in any other direction from the proximal portion.

In the illustrated optical system 50, the proximal portion 56 includes a proximal beam splitter 64 that has faces generally parallel to XY, XZ, and YZ planes. In FIG. 2, a viewing window 66 is coupled to a front side of the proximal beam splitter 64 and allows external light into the proximal beam splitter. The viewing axis 60 is defined through the proximal beam splitter 64 and the viewing window 66 and is directed substantially parallel to the z-axis.

Generally, in use, the viewing location 54 and the eye of the user 62 are positioned at a back side of the proximal beam splitter 64 so that the user can view the real world through the viewing window 66 and the proximal beam splitter along the viewing axis 60. In the present example, the optical system 50 further includes an image former 68 optically coupled to the proximal beam splitter 64. In one example, the image former 68 is configured to reflect light corresponding to the virtual image in the direction of the x-axis.

The proximal beam splitter 64 of FIG. 2 includes a proximal beam-splitting interface 70 that is configured to combine the external light entering the proximal beam splitter through the viewing window 66 with the light that represents the virtual image generated by the optical system 50. In this manner, the real-world environment and the virtual image can be viewed along the viewing axis 60. In one example, the proximal beam-splitting interface 70 is in a plane that forms about 45-degree angles with the faces of the proximal beam splitter 64 that are in the XY-plane and the YZ-plane and is perpendicular to the faces in the XZ-plane. As a result, the proximal beam-splitting interface 70 intersects the viewing axis 60 at about 45 degrees. It is to be understood, however, that other angles and configurations are possible.

As seen in FIG. 2, the distal portion 58 of the optical system 50 includes a distal beam splitter 80 that has faces generally parallel to XY, XZ, and YZ planes. The distal beam splitter 80 is, in turn, optically coupled to the proximal beam splitter 64 by a light pipe 82, for example. The distal beam splitter 80 includes a distal beam-splitting interface 84 that is generally configured to transmit and reflect light to and from the proximal beam splitter 64 through the light pipe 82. Such transmitted and reflected light can be utilized to generate the virtual image. In one example, the distal beam-splitting interface 84 is a plane that forms an angle with the faces of the distal beam splitter 80 that are in the XY-plane and the YZ-plane and is perpendicular to the faces in the XZ-plane. The distal beam-splitting interface 84 is arranged at a non-zero angle with respect to the proximal beam-splitting interface 70. In one example, the distal beam-splitting interface 84 is generally orthogonal to the proximal beam-splitting interface 70. It is to be understood, however, that the orientation of the distal beam-splitting interface 84 may be modified in other examples. For example, the distal beam-splitting interface 84 can be in a plane that is parallel to the proximal beam-splitting interface 70 or parallel to the viewing axis 60.

In one embodiment, the proximal beam splitter 64, the distal beam splitter 80, and the light pipe 82 are made of glass. Alternatively, some or all of such optical components may be made partially or entirely of plastic, which can also function to reduce the weight of the optical system 50. A suitable plastic material is Zeonex® E48R cyclo olefin optical grade polymer, which is available from Zeon Chemicals L.P., Louisville, Ky. Another suitable plastic material is polymethyl methacrylate ("PMMA").

The distal portion 58 further includes a display panel 86 and a light source 88 optically coupled to the distal beam splitter 80. In the present example, the display panel 86 is generally vertically oriented and coupled to a right side of the distal beam splitter 80 and the light source 88 is coupled to a back side of the distal beam splitter.

The display panel 86 is configured to generate a light pattern from which the virtual image is formed. The display panel 86 may be an emissive display such as an Organic Light Emitting Diode ("OLED") display. Alternatively, the display panel 86 may be a Liquid-Crystal on Silicon ("LCOS") or a micro-mirror display such as a Digital Light Projector ("DLP") that generates the light pattern by spatially modulating light from a light source, such as the light source 88. The light source 88 may include, for example, one or more light-emitting diodes ("LEDs") and/or laser diodes. The light pattern generated by the display panel 86 can be monochromatic or may include multiple colors, such as red, green, and blue, to provide a color gamut for the virtual image.

In one example of the optical system 50 in use, the light source 88 emits light toward the distal beam-splitting interface 84, which reflects the light toward the display panel 86. The display panel 86 generates a light pattern by spatially modulating the incident light to provide spatially modulated light reflected toward the distal beam-splitting interface 84. The distal beam-splitting interface 84 transmits the spatially modulated light through the light pipe 82 and toward the proximal beam splitter 64. The proximal beam-splitting interface 70 transmits the spatially-modulated light so that it reaches the image former 68. The image former 68 reflects the spatially-modulated light back toward the proximal beam-splitting interface 70, which reflects the spatially-modulated light toward the viewing location 54 so that the virtual image is viewable along the viewing axis 60.

As a general matter, the reflection and/or transmission of light by and/or through the beam splitters 64, 80 or other optical components of the optical system 50 may refer to the reflection and/or transmission of substantially all of the light or of a portion of the light. Consequently, such terms and descriptions should be interpreted broadly in the present disclosure.

In some embodiments, the proximal and/or distal beam splitters 64, 80 may be polarizing beam splitters, such that the beam splitters preferentially transmit p-polarized light and preferentially reflect s-polarized light, for example. Alternatively, the proximal and/or distal beam splitters 64, 80 may be non-polarizing beam splitters that transmit a portion of the incident light and reflect a portion of the incident light independent (or largely independent) of polarization.

In one embodiment, the proximal beam splitter 64 and the distal beam splitter 80 are polarizing beam splitters that preferentially transmit p-polarized light and preferentially reflect s-polarized light. With this configuration, the external light that is viewable along the viewing axis 60 is generally p-polarized and the light that is viewable along the viewing axis as the virtual image is generally s-polarized. The light source 88 may provide s-polarized light that is partly reflected by the distal beam-splitting interface 84 toward the display panel 86. The display panel 86 spatially modulates the incident s-polarized light and also changes its polarization. Thus, in this example, the display panel 86 converts the incident s-polarized light into a spatially-modulated light pattern of p-polarized light. At least a portion of the p-polarized light is transmitted through the distal beam-splitting interface 84, through the light pipe 82, and through the polarizing proximal beam-splitting interface 70 to the image former 68.

In the present example, the image former 68 includes a reflector 90, such as a concave mirror or Fresnel reflector, and a quarter-wave plate 92. The p-polarized light passes through the quarter-wave plate 92 and is reflected by the reflector 90 back through the quarter-wave plate toward the proximal beam-splitting interface 70. After the light pattern interacts with the image former 68 in this way, the polarization is changed from p-polarization to s-polarization and the s-polarized, spatially-modulated light is reflected by the proximal beam-splitting interface 70 toward the viewing location 54 so that the virtual image is viewable along the viewing axis 60.

Referring back to FIG. 2, the optical system 50 further includes an optical sensor 94 that is optically coupled to the distal beam splitter 80. In FIG. 2, the optical sensor 94 is generally vertically oriented and coupled to a front side of the distal beam splitter 80. The optical sensor 94 can be a camera, such as a wafer-level camera, an infrared ("IR") camera, a CCD image sensor, a CMOS sensor, and the like, with an image sensing portion of the optical sensor directed towards or facing the distal beam splitter 84. The optical sensor 94 is configured to image the external light entering through the viewing window 66 and viewable by the user along the viewing axis 60. The optical sensor 94 may be configured to capture still images and/or video. The still images and/or video captured by the optical sensor 94 may substantially correspond to the view of the real world that the user sees when looking through the viewing window 66 and may be processed with the virtual image to determine where the virtual image is disposed with respect to the real-world environment.

In an example of the optical system 50 in use, external light from the real world enters through the viewing window 66 and is reflected by the proximal beam-splitting interface 70, through the light pipe 82, and toward the distal beam splitter 80. The distal beam-splitting interface 84 reflects the incident external light to the optical sensor 94 to obtain an image of the real-world environment.

In another example, the optical sensor 94 may be disposed on the distal beam splitter 80 with an image sensing portion thereof directed away from the distal beam splitter. In this example, the optical sensor 94 may receive external light directly to image the real-world environment.

In yet another example, the optical sensor 94 may be disposed proximate the viewing location 54, such as on the proximal beam splitter 64. In the present example, an image sensing portion of the optical sensor 94 may be directed away from the viewing location 54 generally along the viewing axis 60 to receive external light directly to image the real-world environment. Alternatively, an image sensing portion of the optical sensor 94 may be directed in another direction and the optical system 50 configured to transmit external light to the image sensing portion to image the real-world environment.

Various modifications can be made to the optical system 50 of FIG. 2 without departing from the spirit of the present disclosure. For example, the optical system 50 of FIG. 2 may be part of the display system 20 of FIG. 1, so as to be coupled to the processor 32, the data storage 34, the power supply 36, and/or the I/O components 38. Such components 32-38 may be coupled to the display panel 86, the light source 88, and/or the optical sensor 94 in any known manner. In another example, the proximal and/or distal beam-splitting interfaces 70, 84 may be curved to account for a curvature of the reflector 90 and/or a curvature of a lens (not shown) of the optical sensor 94.

Figure 3:
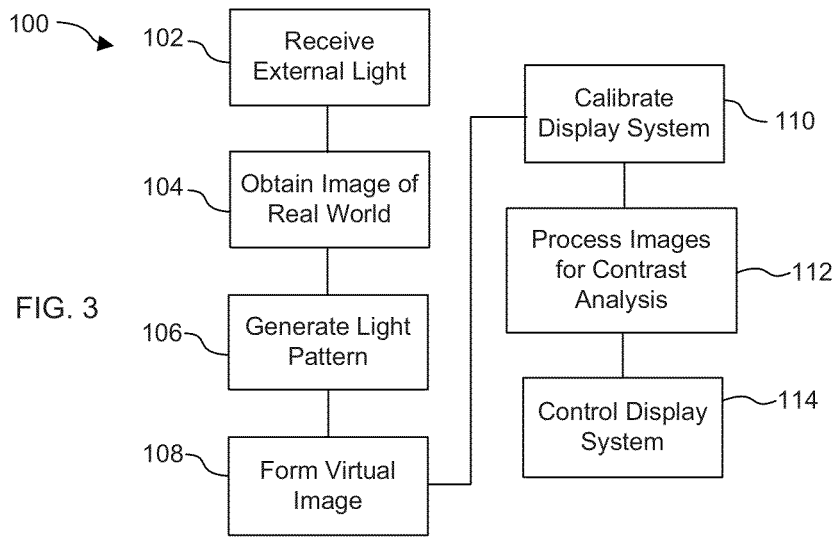
FIG. 3 is a flowchart of a process for obtaining and using real-world and virtual image contrast information in accordance with an example embodiment.

Referring now to FIG. 3, an example flowchart 100 is illustrated that includes a process for obtaining and using real-world and virtual image contrast information. The process of FIG. 3 may be performed by utilizing various hardware and/or software components of the display system 20 of FIG. 1 and the optical system 50 of FIG. 2, for example.

In FIG. 3, the flowchart 100 begins at a block 102, during which external light that represents the real-world environment is received, such as by the optical sensor 94 described above. Next control passes to a block 104 and the received external light is processed to obtain an image or other representation of the real world.

Following the block 104, control passes to a block 106, which generates a light pattern from which a virtual image can be formed. Referring to FIG. 2, for example, the light pattern may be generated by the display panel 86 and/or the display panel in combination with the light source 88. Next, control passes to a block 108 and the light pattern is formed into a virtual image viewable by a user, as described above, for example.

In the illustrated flowchart 100, control then passes to a block 110 during which a calibration process may be performed. In one example, the calibration process includes calibrating the virtual image with the user's view of the real-world environment. The calibration process in accordance with one non-limiting example includes displaying one or more markers or indicia in the virtual image overlaid on the user's real-world view. The indicia may correspond to background features in the real-world view. In the present example, the user may be instructed to align the indicia with the background features in the real-world view as the image of the real world obtained by the display system is processed. The user may be instructed to provide an input, for example, through the I/O components 38, when the indicia are aligned or may be instructed to align the indicia for a given time period, for example, about 1-2 seconds. In one example, the indicia may include portions of the image of the real-world view that can be aligned with the user's actual view of the real world. The processing of the image of the real world as the user aligns the indicia can be used to calibrate the virtual image with the user's real-world environment.

At a block 112, such calibration may be used to accurately identify background features in the real-world environment over which the virtual image is overlaid. In one example, the block 112 identifies image pixels that correspond to background features that are directly overlaid by the virtual image. In another example, the block 112 also identifies image pixels that are adjacent to the pixels directly overlaid by the virtual image. The block 112 also processes the identified background features to determine visual characteristics thereof. Such visual characteristics may include pixel data relating to intensity, hue, and/or saturation of the background features. The visual characteristics of the background features may be compared to threshold values and/or to visual characteristics of the virtual image to analyze the contrast between the virtual image overlaid on the background features.

At a block 114, the display system can be controlled in response to the contrast analysis. In one example, the block 114 may control the display system by modifying the light pattern to increase the contrast between the virtual image and the background features so that the virtual image is more distinguishable from the background. In another example, the block 114 may control the display system by modifying the light pattern to decrease the contrast between the virtual image and the background features so that the background may be more visible through the virtual image.

Various modifications can be made to the flowchart 100 of FIG. 3, for example, additional or fewer process blocks can be utilized and arranged in any appropriate order or even executed concurrently. For example, the calibration process may be omitted, performed only once by a manufacturer of the display device, or performed multiple times in any order with respect to the other process blocks.

Figure 4:
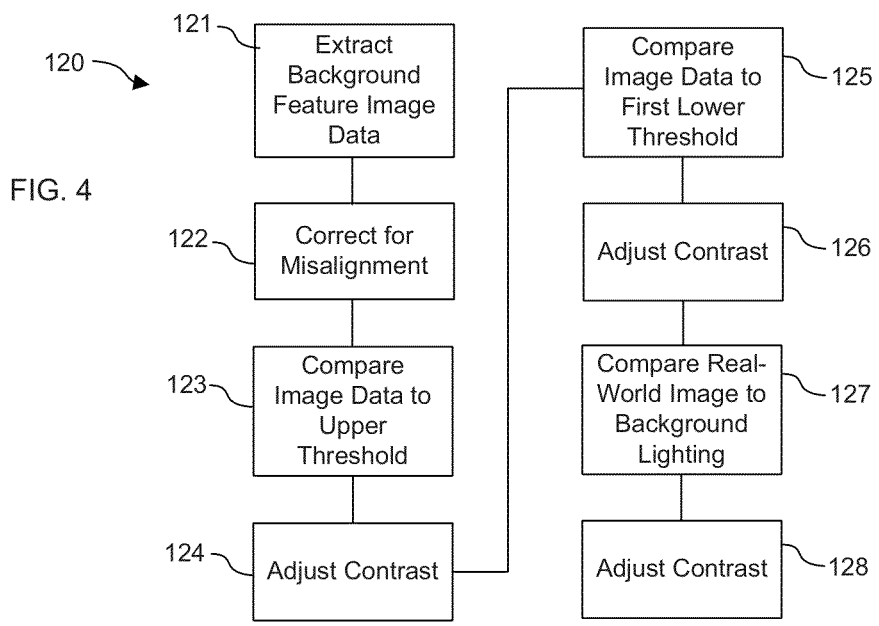
FIG. 4 is a flowchart of a process for analyzing and adjusting the contrast between a virtual image and a background feature in a real-world environment over which the virtual image is overlaid in accordance with an example embodiment.

FIG. 4 illustrates another flowchart 120 of a process for analyzing and adjusting the contrast between a virtual image and a background feature in a real-world environment over which the virtual image is overlaid. The flowchart 120 begins at a block 121, which extracts pixel data that corresponds to the background features, such as the background features identified in the block 112 of FIG. 3. In one example, pixel data from the image of the background feature are extracted and converted into an image data mask. The mask can be a 1-bit monochrome mask with pixel intensity values of 0 (dark) or 1 (bright) for each pixel. In other examples, the monochrome mask may be a 2-bit, 4-bit, 8-bit, etc. data mask associated with real values between and including 0 and 1. The values 0 and 1 may correspond to darkest and brightest values, respectively, associated with an optical sensor and/or image generator of an optical system. In other examples, the dark and bright values may be defined by any other scale, such as 0 to 16, 0 to 255, 0% to 100%, etc. In further examples, pixel data from the image of the background feature may be converted to a color data mask that includes color pixel data.

In the illustrated flowchart 120, control then passes to a block 122 to correct for misalignment between the image of the real-world environment, a view of the real-world environment from the viewing location, and/or the virtual image. In one example, misalignment may be corrected utilizing data from the calibration process of the block 110 of FIG. 3. Alternatively or in combination, the image data mask may be the blurred with an averaging filter, such as a Gaussian filter, to account for misalignment.

After the block 122, control passes to a block 123 to compare pixel data values of the background features to an upper threshold pixel value. Generally, the block 123 is performed to identify bright background features that make it more difficult to identify virtual image details, such as text. In one example, pixel values of the data mask corresponding to the background features are compared to the upper threshold value on a per pixel basis. Although, in other examples, the data mask of the background features can be divided into pixel groups having pixel values that are averaged and compared to the upper threshold value.

Next, control passes to a block 124 to adjust the contrast of pixels of the virtual image that correspond to pixels of the background features that have values greater than the upper threshold value. The contrast of such virtual image pixels can be adjusted by enhancing the original virtual image using any suitable method, such as histogram equalization. In one example, an enhanced virtual image is obtained by rescaling and clipping pixel values of the original virtual image. For example, the following algorithm (1) may be used when intensity values are scaled between 0 and 1:

$$I\_enhanced(x,y)=\min(1,\max(0,I\_original(x,y)-V\_dark)/(V\_bright-V\_dark)) \quad (1)$$

In the above algorithm, I_enhanced(x,y) is the intensity of an enhanced virtual image pixel located at (x,y); I_original(x,y) is the intensity of a pixel located at (x,y) in the original virtual image; V_dark and V_bright are pixel values in the original virtual image for the darkest and brightest points, respectively. V_dark and V_bright can be determined, for example, by histogram equalization. Various modifications can be made to algorithm (1), such as to modify the algorithm when the intensity values are defined by other scales.

In another example, the contrast of the virtual image can be further adjusted by blending the original virtual image with an enhanced virtual image. One example of the blending process includes a per pixel linear interpolation between the original virtual image and an enhanced image using the data mask as a blending factor. In one example, the following blending algorithm (2) may be used when intensity values are scaled between 0 and 1:

$$I\_corrected(x,y)=M(x,y)*I\_original(x,y)+(1-M(x,y))*I\_enhanced(x,y) \quad (2)$$

In the above algorithm, I_corrected(x,y) is the intensity of a blended pixel located at (x,y); M(x,y) is the pixel value of the data mask at (x,y); I_original(x,y) is the intensity of a pixel located at (x,y) in the original image; and I_enhanced(x,y) is the intensity of an enhanced virtual image pixel located at (x,y). Various modifications can be made to algorithm (2), such as when the intensity values are defined by other scales.

After the block 124, control passes to a block 125 to compare pixel data values of the background features to a lower threshold pixel value. Generally, the block 125 is performed to identify dark background features that make it more difficult to identify virtual image details, such as text. In one example, pixel values of the data mask corresponding to the background features are compared to the lower threshold value on a per pixel basis. Although, in other examples, the data mask of the background features can be divided into pixel groups having pixel values that are averaged and compared to the lower threshold value.

Next, control passes to a block 126 to adjust the contrast of pixels of the virtual image that correspond to pixels of the background features that have values less than the lower threshold value. The contrast of such virtual image pixels can be adjusted by enhancing the original virtual image using any suitable method, such as histogram equalization. In one example, an enhanced virtual image is obtained by rescaling and clipping pixel values of the original virtual image. For example, the following algorithm (1) may be used:

$$I\_enhanced(x,y)=\min(1,\max(0,I\_original(x,y)-V\_dark)/(V\_bright-V\_dark)) \quad (1)$$

The contrast of the virtual image over dark backgrounds can also be further adjusted by blending the original virtual image with the enhanced virtual image. The blending may be performed using blending algorithm (2), as discussed above:

$$I\_corrected(x,y)=M(x,y)*I\_original(x,y)+(1-M(x,y))*I\_enhanced(x,y) \quad (2)$$

Following the block 126, control passes to a block 127 to compare the image of the real-world environment to background lighting of the virtual image. In one example, the block 127 compares a minimum intensity value of the real-world image, such as a minimum intensity value of a background feature overlaid by a virtual image, to an intensity value of the background lighting of the virtual image. Generally, the block 127 is performed to identify portions of the virtual image that may be too bright and cause an undesirable graying effect in portions of the user's real-world view. In particular, such graying effect may occur with dark background features. The comparison in the block 127 determines whether the background lighting for the virtual image is too bright based on a mapping of optical background lighting intensities in relation to real-world light intensities. Generally, such mapping is specific to a particular optical display system and identifies highest background lighting intensity values with respect to real-world light intensity values to avoid the graying effect. In the block 127, a minimum intensity value of the real-world image is identified and the background lighting of the virtual image is set to an intensity value based on such mapping.

Thereafter, control passes to a block 128 and the contrast of the virtual image can be adjusted, for example, as described above. In one example, the background lighting intensity value is taken into account in determining the values of V_bright and V_dark.

Various modifications can be made to the flowchart 120 of FIG. 4, for example, additional or fewer process blocks can be utilized and arranged in any appropriate order or even executed concurrently. For example, the flowchart 120 may include a single block that compares the image data to upper and lower thresholds instead of having separate blocks 123, 125.

Figure 5:
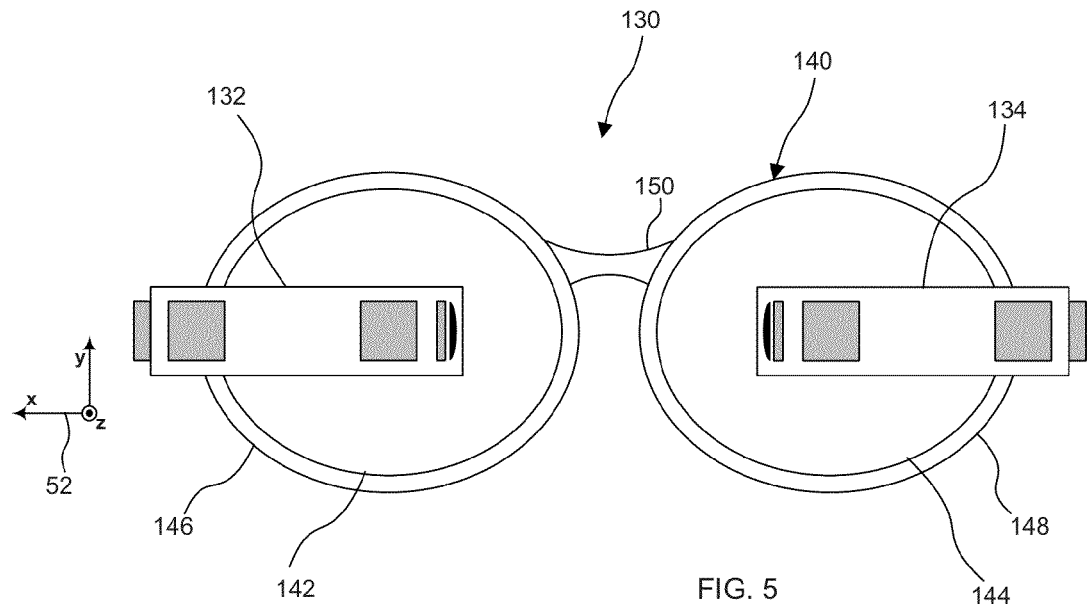
FIG. 5 is a front elevational view of a head-mounted display in accordance with an example embodiment.
Figure 6:
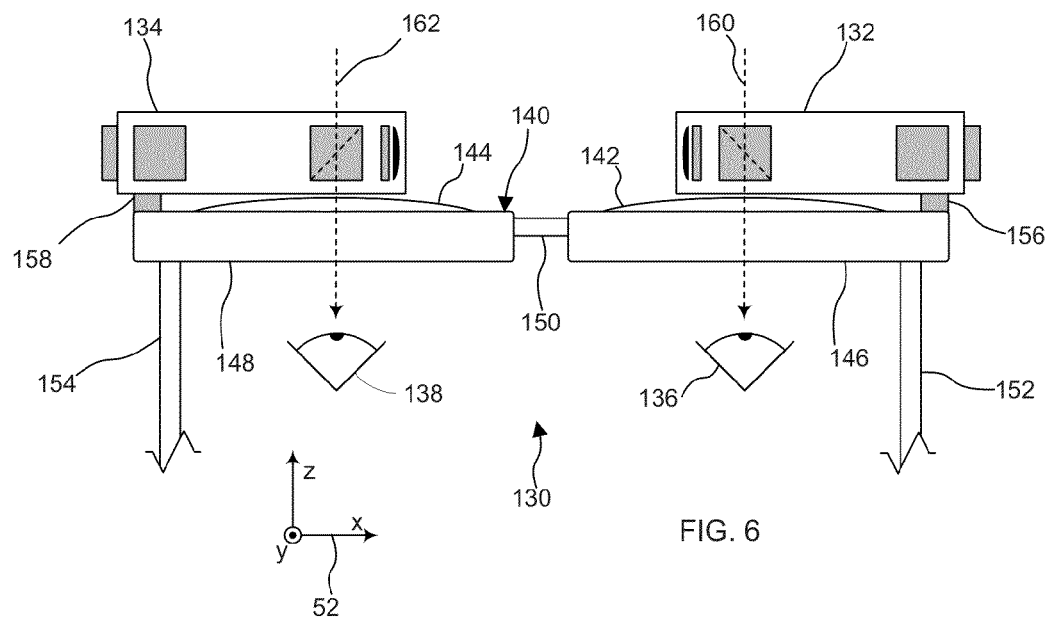
FIG. 6 is a plan view of the head-mounted display of FIG. 5.
Figure 7:
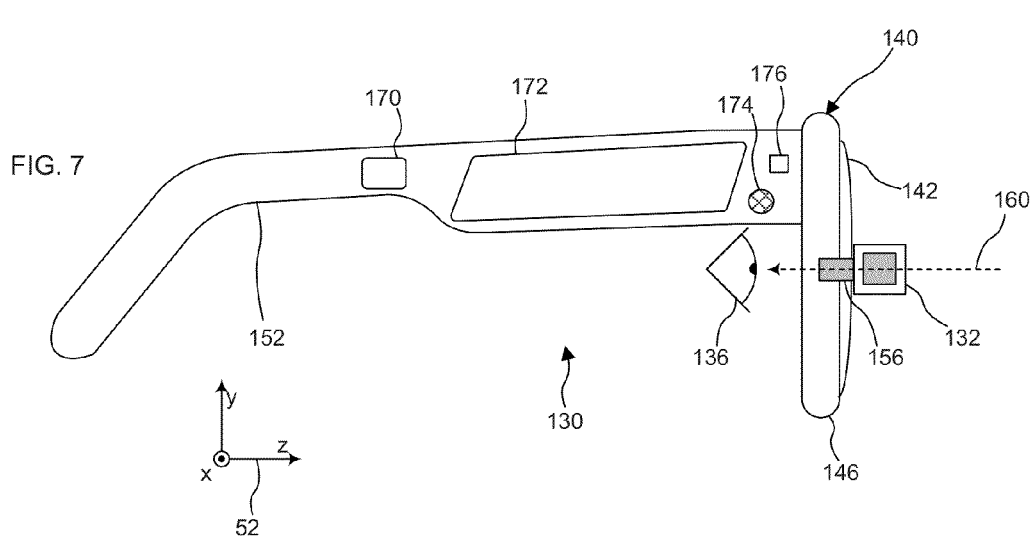
FIG. 7 is a side elevational view of the head-mounted display of FIG. 5.

Referring now to FIGS. 5, 6, and 7, the systems described above for FIGS. 1 and 2 may be attached to a head-mounted support in a position such that the viewing axis is conveniently viewable by either a left or right eye of the wearer or user. In this way, a head-mounted display (HMD) may be provided through which the outside world is viewable. The HMD may also function as a wearable computing device. In FIGS. 5-7, an HMD 130 includes see-through display devices 132 and 134 for the wearer's right eye 136 and left eye 138, respectively. The display devices 132, 134 are attached to a head-mountable support 140. In this example, the head-mountable support 140 is configured in the form of eyeglasses with lenses 142, 144 positioned over the right eye 136 and the left eye 138, respectively. The lenses 142, 144 and are held in place by respective frames 146 and 148. The head-mountable support 140 also includes a bridge piece 150 that is connected to the frames 146, 148 and is configured to be supported by the bridge of the user's nose. In addition, the head-mountable support 140 includes side-pieces 152 and 154 connected to frames 146, 148, respectively, which may hook behind the user's ears.

The right-side display device 132 may be attached to the frame 146 by a mount 156 and the left-side display device 134 may be attached to the frame 148 by a mount 158. The mounts 156, 158 position the display devices 132, 134 so that their respective viewing axes 160, 162 are generally aligned with the user's right eye 136 and left eye 138, respectively. Thus, as shown in FIG. 6, the viewing axis 160 of the right-side display device 132 may extend to the user's right eye 136 through the lens 142 and the viewing axis 162 of the left-side display device 134 may extend to the user's left eye 138 through the lens 144. To achieve this configuration, the mounts 156, 158 can be fixed mounts or they can be adjustable by the user in order to properly and comfortably align the display devices 132, 134.

Although FIGS. 5-7 illustrate the HMD 130 with the display devices 132, 134 separate from the lenses 142, 144 and the frames 146, 148, it should be understood that other configurations are possible. For example, some or all of the components of the display devices 132, 134 can be integrated into the lenses 142, 144 and/or the frames 146, 148. For example, beam splitters and light pipes may be integrated into the lenses 142, 144 and/or display panels may be integrated into the frames 146, 148. In addition, other embodiments may include a display device for only one of the wearer's eyes. In other examples, the HMD 130 may be configured as goggles, a helmet, a head-band, or a hat. Further, instead of a head-mountable support 140, the support mount can be on a user-mountable support that can be mounted on the user in other ways, such as on one or both of the user's shoulders or on a backpack being worn by the user.

As noted above, the HMD 130 may function as a wearable computing device. In this regard, the HMD may include a processor 170, which can be located inside of or attached to part of the head-mountable support 140. For example, the processor 170 can be located inside of the side-piece 152, as shown in FIG. 7. However, other configurations are possible.

In one embodiment, the processor 170 is configured to control display panels in the display devices 132, 134 in order to control the virtual images that are generated and displayed to the user. Further, the processor 170 is configured to control optical sensors and to receive images or video captured by the optical sensors. The processor 170 may be communicatively coupled to the display devices 132, 134 by wires inside of the head-mountable support 140, for example. Alternatively, the processor 170 may communicate with the display devices 132, 134 through external wires or through a wireless connection.

The HMD 130 may also include other components that are operatively coupled to the processor 170 to provide desired functionality. For example, the HMD 130 may include one or more touchpads, microphones, and sensors, which are exemplified in FIG. 7 by a touchpad 172, a microphone 174, and a sensor 176 on the side-piece 152. It is to be understood, however, that these components can be located elsewhere in the HMD 130. By appropriate touch interaction with the touchpad 172, the user may control or provide input to the HMD 130. The microphone 174 may be used to receive voice commands from the user and/or to record audio data from the user's surroundings. The sensor 176 may include an accelerometer and/or gyroscope configured to sense movement of the HMD 130. The sensor 176 may also include a global positioning system receiver for determining the location of the HMD. Additionally, the sensor 176 may represent a camera or plurality of cameras that may be configured to observe various fields of view around the HMD 130. The HMD 130 may also include a wired and/or wireless interface through which the processor 170 may exchange data with other computing systems or other devices. In addition to the foregoing, the HMD 130 could also include other types of sensors, user interface components, and/or communication interface components.

The processor 170 may control the content of the virtual images generated by the display systems 132, 134 and in response to various inputs. Such inputs may come from the touchpad 172, the microphone 174, the sensor 176, and/or a wired or wireless communication interfaces of HMD. The processor 170 may also control the appearance of the virtual images in response to background feature analysis, as described above. In this way, the processor 170 may control the appearance of the virtual images so that it is appropriate for the user's current surroundings and/or tasks in which the user is involved.

The above detailed description describes various features and functions of the disclosed systems, devices, and methods with reference to the accompanying drawings. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
generating a light pattern using a display panel;
forming a virtual image from the light pattern utilizing one or more optical components, wherein the virtual image is viewable from a viewing location;
receiving external light from a real-world environment incident on an optical sensor, wherein the real-world environment is viewable from the viewing location;
obtaining an image of the real-world environment from the received external light;
identifying a background feature in the image of the real-world environment, wherein the background feature corresponds to a portion of the viewable real-world environment over which the virtual image is overlaid;
extracting, from the image of the real-world environment, pixel data indicative of one or more visual characteristics of the background feature;
comparing at least one of brightness, hue, or saturation included in the pixel data to an upper threshold value and a lower threshold value;
generating a data mask based on the pixel data and
increasing, based on the comparison, contrast between the virtual image and the viewable real-world environment by controlling the generation of the light pattern, wherein increasing the contrast comprises blending the virtual image with an enhanced virtual image using the data mask as a blending factor.

2. The method of claim 1, further comprising obtaining the enhanced virtual image by histogram equalization.

3. The method of claim 1, further comprising decreasing the brightness of background lighting of the display panel and increasing the brightness of the virtual image if the brightness included in the pixel data is lower than the lower threshold value.

4. The method of claim 1, further comprising correcting for misalignment between the image of the real-world environment and a view of the real-world environment from the viewing location.

5. The method of claim 4, wherein the step of correcting includes applying an averaging filter to the image of the real-world environment.

6. The method of claim 1, wherein the display panel and the one or more optical components are coupled to a head-mounted display.

7. A display system comprising:
a display panel configured to generate a virtual image;
a first beam splitter optically coupled to the display panel, wherein the virtual image and a real-world view are viewable through the first beam splitter from a viewing location;
a second beam splitter optically coupled to the first beam splitter;
a camera optically coupled to the second beam splitter, wherein the camera is configured to image the real-world view; and
a controller operatively coupled to the camera and the display panel, wherein the controller is configured to identify in the real-world view a background feature over which the virtual image is superimposed, to extract pixel data indicative of one or more visual characteristics of the background feature, to generate a data mask based on the pixel data, to compare at least one of brightness, hue, or saturation included in the pixel data to an upper threshold value and a lower threshold value, to enhance the contrast of the virtual image with respect to the real-world view based on the comparison, wherein the enhancement comprises blending the virtual image with an enhanced virtual image using the data mask as a blending factor.

8. The display system of claim 7, wherein the controller is configured to enhance the contrast of the virtual image with respect to the real-world view if the at least one of brightness, hue, or saturation included in the pixel data is higher than the upper threshold value or lower than the lower threshold value.

9. The display system of claim 7, wherein the controller is configured to decrease the brightness of background lighting of the display panel and to increase the brightness of the virtual image if the brightness included in the pixel data is lower than the lower threshold.

10. The display system of claim 7, further comprising;
a light source coupled to the second beam splitter, wherein the display panel is coupled also to the second beam splitter; and
a reflector coupled to the first beam splitter.

11. The display system of claim 10, wherein the display panel is configured to spatially modulate light emitted by the light source, and wherein the first and second beam splitters are configured to transmit the spatially modulated light to the reflector, the reflector is configured to reflect the spatially modulated light toward a beam-splitting interface of the first beam splitter, and the beam-splitting interface is configured to reflect the spatially modulated light toward the viewing location as the virtual image.

12. The display system of claim 10, further comprising a quarter-wave plate coupled between the reflector and the first beam splitter, wherein the first beam splitter is a polarizing beam splitter.

13. The display system of claim 10, wherein the reflector is a curved reflector and the first and second beam splitters include first and second beam-splitting interfaces, respectively, and wherein at least one of the first and second beam-splitting interfaces is a curved interface.

14. The display system of claim 7, wherein the camera is disposed at a distal surface of the second beam splitter and an image sensing portion of the camera is directed toward the second beam splitter.

15. The display system of claim 7, wherein at least one of the first and second beam splitters is a polarizing beam splitter.

16. A display system comprising:
a display panel configured to generate a light pattern;
one or more optical components coupled to the display panel and configured to transmit the light pattern and external light from a real-world environment, wherein the light pattern is viewable from a viewing location through the one or more optical components as a virtual image superimposed over the real-world environment;
an optical sensor coupled to the one or more optical components and configured to receive the external light to obtain an image of the real-world environment; and
a processor coupled to the display panel and the optical sensor and configured to identify a background portion of the real-world environment over which the virtual image is superimposed, to extract pixel data corresponding to one or more visual characteristics of the background portion, to generate a data mask based on the pixel data, to compare at least one of brightness, hue, or saturation included in the pixel data to an upper threshold value and a lower threshold value, to increase the contrast between the virtual image and the background portion based on the comparison by blending the virtual image with an enhanced virtual image using the data mask as a blending factor to provide a blended image, and to control the generation of the light pattern based on the blended image.

17. The display system of claim 16, wherein the processor is configured to control the generation of the light pattern to increase contrast between the virtual image and the background portion if the at least one of brightness, hue, or saturation included in the pixel data is higher than the upper threshold value or lower than the lower threshold value.

18. The display system of claim 17, wherein the processor is configured to decrease the brightness of background lighting of the display panel and to increase the brightness of the virtual image if the brightness included in the pixel data is lower than the lower threshold.

19. The display system of claim 16, further comprising a head-mounted display.

* * * * *